(12) United States Patent
Chandrapati et al.

(10) Patent No.: US 9,441,518 B2
(45) Date of Patent: Sep. 13, 2016

(54) DIAPHRAGM PUMP SYSTEM HAVING RE-PRIMING CAPABILITIES

(71) Applicant: Cummins Emission Solutions, Inc., Columbus, IN (US)

(72) Inventors: Srivardhan Chandrapati, Columbus, IN (US); Andrew Morgan Myer, Greenwood, IN (US); Mugdha Naik, Columbus, IN (US); Shu Zhang, Columbus, IN (US); Xin Jin, Columbus, IN (US); Srinivasa Varadan Rajagopalan, Ann Arbor, MI (US); John K. Heichelbech, Columbus, IN (US); Stephen M. Holl, Columbus, IN (US)

(73) Assignee: Cummins Emission Solutions, Inc., Columbus, IN (US)

( * ) Notice: Subject to any disclaimer, the term of this patent is extended or adjusted under 35 U.S.C. 154(b) by 19 days.

(21) Appl. No.: 14/455,245

(22) Filed: Aug. 8, 2014

(65) Prior Publication Data

US 2015/0047727 A1 Feb. 19, 2015

Related U.S. Application Data

(60) Provisional application No. 61/865,452, filed on Aug. 13, 2013.

(51) Int. Cl.
*F01N 3/00* (2006.01)
*F01N 3/20* (2006.01)

(52) U.S. Cl.
CPC ......... *F01N 3/2066* (2013.01); *F01N 2610/02* (2013.01); *F01N 2610/144* (2013.01); *F01N 2610/1433* (2013.01); *Y02T 10/24* (2013.01); *Y10T 137/85986* (2015.04)

(58) Field of Classification Search
CPC .... F02D 41/029; F01N 9/002; F01N 3/0842; F01N 3/035; F01N 13/02; F04B 43/07; F04B 49/03; F04B 49/035; F04B 49/065; F04B 49/24
USPC .................................. 60/273, 274, 295, 303
See application file for complete search history.

(56) References Cited

U.S. PATENT DOCUMENTS

| | | | | |
|---|---|---|---|---|
| 1,824,465 A * | 9/1931 | Carter, Jr. | ............... | F04D 9/005 415/11 |
| 2,100,365 A * | 11/1937 | Stratton | .................... | F04D 9/02 415/11 |
| 2,174,960 A * | 10/1939 | Barzen | ...................... | F04D 9/02 415/11 |
| 2,391,769 A * | 12/1945 | Campbell | ................. | F04D 9/02 137/115.01 |
| 2,639,671 A * | 5/1953 | Wagner | ..................... | F04D 9/02 137/202 |
| 2,653,546 A | 9/1953 | Marlos, Jr. | | |
| 2,687,696 A | 8/1954 | Theis | | |
| 4,153,385 A | 5/1979 | Riefenthaler | | |
| 4,515,180 A | 5/1985 | Napolitano | | |
| 5,732,554 A * | 3/1998 | Sasaki | ................ | B01D 53/9481 60/278 |

(Continued)

*Primary Examiner* — Patrick Maines
(74) *Attorney, Agent, or Firm* — Foley & Lardner LLP

(57) ABSTRACT

An example system includes a diaphragm pump having a suction port and a discharge port, a urea suction line fluidly coupling a urea supply to the suction port, and a urea discharge line fluidly coupled to the discharge port. A recirculation line fluidly couples the urea discharge line to the urea suction line, and has a flow regulator operationally coupled thereto. A controller is configured to interpret a prime loss condition of the diaphragm pump, and to provide a flow regulator command in response to the prime loss condition.

20 Claims, 3 Drawing Sheets

(56) References Cited

U.S. PATENT DOCUMENTS

| | | | |
|---|---|---|---|
| 5,868,550 A * | 2/1999 | Howchin | F04D 9/006 415/1 |
| 6,253,735 B1 * | 7/2001 | Miyajima | F02M 63/0245 123/179.17 |
| 7,059,824 B2 | 6/2006 | Ramacciotti | |
| 8,195,378 B2 | 6/2012 | Guo et al. | |
| 8,473,181 B2 | 6/2013 | Guo et al. | |
| 2001/0039944 A1 * | 11/2001 | Braun | F02D 33/003 123/510 |
| 2004/0175279 A1 * | 9/2004 | Ramacciotti | F04D 9/048 417/307 |
| 2009/0095061 A1 * | 4/2009 | Fujino | B60R 16/0232 73/114.41 |
| 2011/0047972 A1 * | 3/2011 | Bauer | B01D 53/90 60/274 |
| 2012/0051945 A1 | 3/2012 | Orndorff et al. | |
| 2015/0030466 A1 * | 1/2015 | Muntean | F01N 3/2066 417/53 |

* cited by examiner

DIAPHRAGM PUMP SYSTEM HAVING RE-PRIMING CAPABILITIES

CROSS-REFERENCE TO RELATED PATENT APPLICATIONS

The present application claims priority to U.S. Provisional Patent Application No. 61/865,452, filed Aug. 13, 2013 and the contents of which are incorporated herein by reference in the entirety.

BACKGROUND

Urea distribution systems are often used in selective catalytic reduction (SCR) processes. The urea, in conjunction with an SCR catalyst, reduces NOx, for example in an exhaust stream from an internal combustion engine. An example SCR catalyst may treat the exhaust of a diesel engine on a motor vehicle, which produces a variable amount of NOx in response to the duty cycle variations of the vehicle. In such processes, the amount of urea required for effective NOx reduction depends on the exhaust flow rate and the concentration of NOx in the exhaust stream. The amount of urea injected may be highly variable or transient during certain operating periods, while during other periods the urea injection may be discontinued. The loss of urea injection capability during operations experiencing highly variable NOx output may be especially detrimental to meeting emissions requirements or other operational requirements.

A urea distribution system may utilize a pump to provide pressurized urea to an injector for injecting into the exhaust of an engine. A diaphragm pump is a desirable alternative for such a pump. However, diaphragm pumps suffer from several drawbacks, including a limited ability to self-prime. When a diaphragm pump loses prime, the limited compression ratio of the pump prevents the exit valve from opening into a pressurized downstream line, causing the pump to experience "vapor lock."

Presently known urea distribution systems manage potential vapor locking with a return line recirculating from the pump inlet to the urea tank. With a return line installed, a pump that has lost prime can recirculate air into the urea tank and receive liquid at the inlet, allowing the pump to re-prime. The presence of a return line requires additional plumbing of lines, including additional installation space, additional potential leakage sites, and a more complex response of the system to the vibration environment. Further improvements in this area are desirable.

SUMMARY

Unique diaphragm pump re-priming apparatuses, methods, and systems are disclosed. An example system includes a diaphragm pump having a suction port and a discharge port, a urea suction line fluidly coupling a urea supply to the suction port, and a urea discharge line fluidly coupled to the discharge port. A recirculation line fluidly couples the urea discharge line to the urea suction line, and has a flow regulator operationally coupled thereto. A controller is configured to interpret a prime loss condition of the diaphragm pump, and to provide a flow regulator command in response to the prime loss condition.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF VARIOUS EMBODIMENTS

Figure 1:
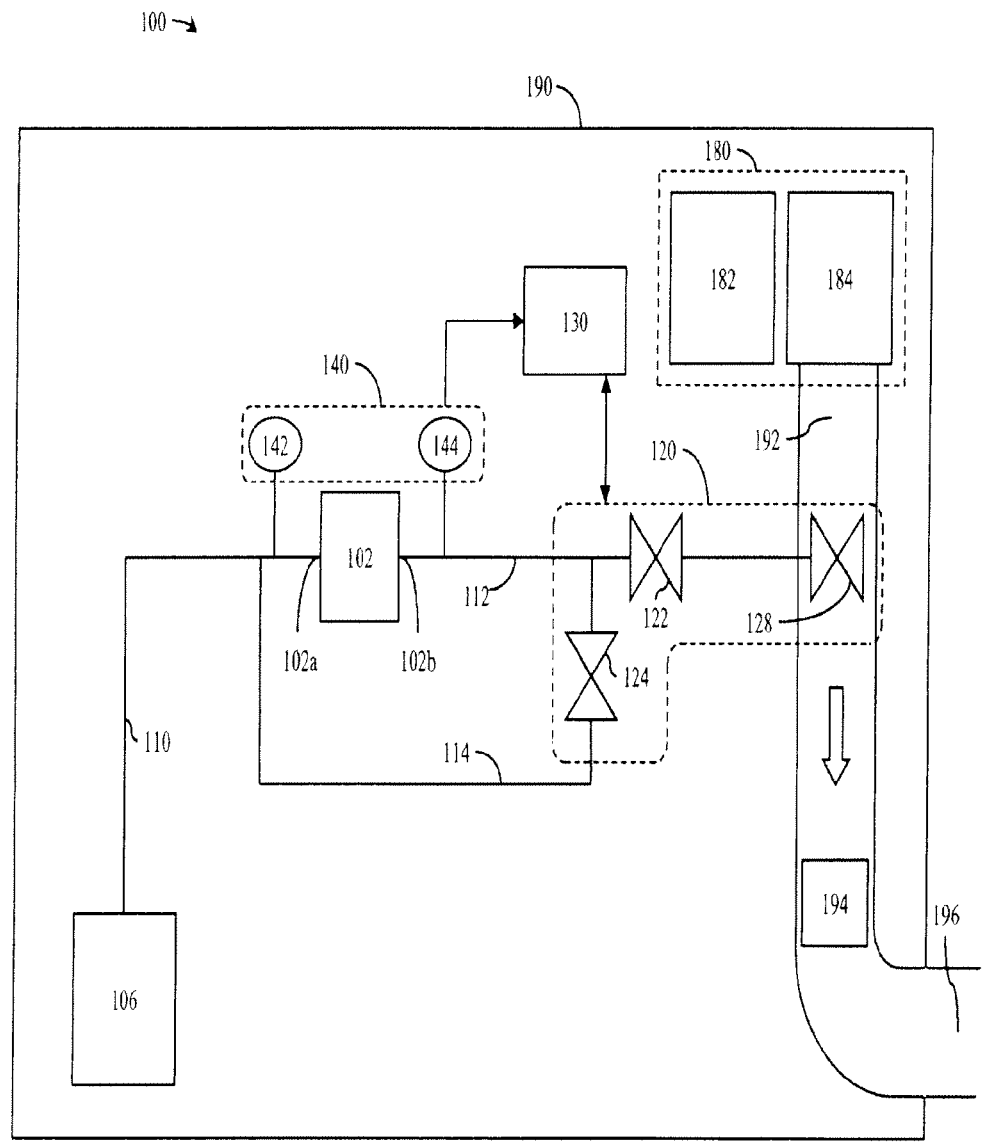
FIG. 1 is a schematic illustration of an example diaphragm pump system.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments, and that such further applications of the principles of the invention as illustrated therein as would normally occur to one skilled in the art to which the invention relates are contemplated and protected.

In certain embodiments, a controller is described performing certain operations to control valve positions, or other operations. In certain embodiments, the controller forms a portion of a processing subsystem including one or more computing devices having memory, processing, and communication hardware. The controller may be a single device or a distributed device, and the functions of the controller may be performed by hardware and/or computer implemented components.

In certain embodiments, the controller includes one or more modules structured to functionally execute the operations of the controller. In certain embodiments, the controller includes a prime loss module and a valve control module. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or computer instructions stored on a non-transient computer readable storage medium, and modules may be distributed across various hardware or computer implemented components.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any module or controller described herein that would be understood by one of skill in the art is contemplated herein. The modules and controllers herein, once the operations are described, are capable of numerous hardware and/or computer based implementations, many of the specific implementations of which involve mechanical steps for one of skill in the art having the benefit of the disclosures herein and the understanding of the operations of the modules and the controllers provided by the present disclosure. More specific descriptions of certain embodiments of controller operations are included in the section referencing FIG. 2.

Certain operations described herein include operations to interpret one or more parameters. Interpreting, as utilized herein, includes an operation to have the value made available by any method known in the art, including at least receiving the value from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any method known in the art (e.g. from an operator input), receiving a value by which the interpreted parameter can be calculated, and/or by referencing a default value that is interpreted to be the parameter value.

With reference to FIG. 1, there is illustrated an example urea supply system 100 which includes a diaphragm pump 102, a urea supply 106, a valve system 120, a controller 130, and sensors 140. The various components are fluidly coupled by a number of fluid lines, including a urea suction line 110, a urea discharge line 112, and a recirculation line 114. Valve system 120 includes a recirculation line flow regulator 124, and may include an exit valve 122 and/or an injector 128.

Diaphragm pump 102 includes a suction port 102a and a discharge port 102b. Suction line 110 fluidly couples suction port 102a to urea supply 106, which stores a quantity of an aqueous urea solution. Discharge line 112 is fluidly coupled to discharge port 102b. An exit valve 122 may be operationally coupled to discharge line 112, and may be configured as a metering valve. Recirculation line 114 fluidly couples discharge line 112 to suction line 110, and has flow regulator 124 operationally coupled thereto. As illustrated in FIG. 1, recirculation line 114 has a first opening to the urea discharge line, and a second opening to the urea suction line.

In the illustrated embodiment, discharge line 112 is further coupled to injector 128. Injector 128 may be an injector valve, and the operation thereof may be controlled by controller 130. Injector 128 is operationally coupled to an exhaust conduit 192, and is configured to inject urea from discharge line 112 into exhaust conduit 192. System 100 may further include a compressed air supply (not shown), such that the urea injection is an air-assisted urea injection.

An internal combustion engine 184 exhausts to exhaust conduit 192. The exhaust has a NOx constituent as a byproduct of operation of engine 184. In the illustrated embodiment, engine 184 is a diesel engine, and exhaust conduit 192 is a diesel exhaust conduit, but it is contemplated that other fuels may be used.

An SCR catalyst 194 is disposed in exhaust conduit 192 downstream of injector 128. When urea is injected into the exhaust gas stream via injector 128, the urea, in conjunction with SCR catalyst 194, reduces at least a portion of the NOx constituent in the exhaust stream. The exhaust may then be discharged to the environment via exhaust outlet 196.

Engine 184 may be included in a powertrain 180, which may power a vehicle 190. For example, engine 184 may be a diesel engine, and vehicle 190 may be a truck, ship, or locomotive. It is additionally or alternatively contemplated that engine 184 may be configured to supply power for other systems, such as an electrical generator, power plant, or hydraulic pump.

Each of sensors 140 is configured to sense one or more conditions of system 100, and to transmit information regarding the condition to controller 130. In the illustrated embodiment, sensors 140 include suction line pressure sensor 142 and discharge line pressure sensor 144. It is also contemplated that more, fewer, or alternative sensors may be included, and such sensors may be configured to sense other conditions, for example temperature or flow rate.

Controller 130 is configured to interpret a prime loss condition of the diaphragm pump, and to issue commands to one or more of valves 120, including at least flow regulator 124. Further details regarding controller 130 are discussed below with reference to FIG. 2.

Figure 2:
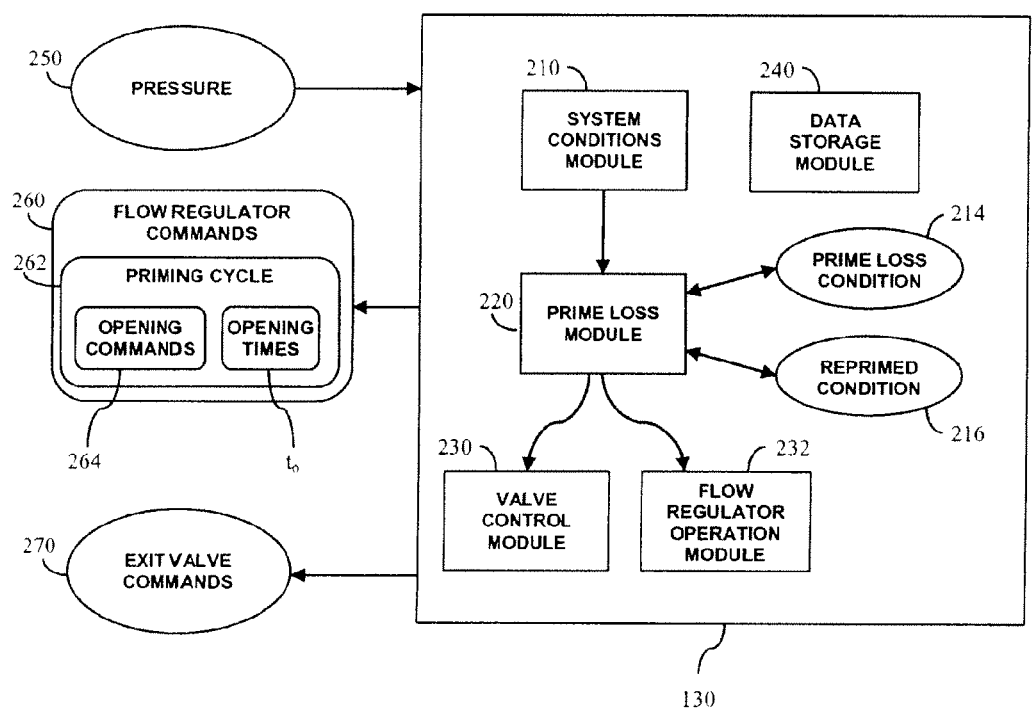
FIG. 2 is a schematic illustration of an example controller.

FIG. 2 is a schematic illustration of an example controller 130, which includes a system conditions module 210, a prime loss module 220, a valve control module 230, and a data storage module 240. Controller 130 receives information from at least one sensor, and may additionally or alternatively be in communication with a user interface, a datalink, and/or a network. Controller 130 provides commands to at least flow regulator 124, and may further provide commands to one or more other components of system 100, such as diaphragm pump 102, exit valve 122, and injector 128.

Data storage module 240 is configured to store data on one or more non-transitory computer readable media for use by other modules of controller 130. Data storage module 240 may store, for example, sensor data such as sensor calibration data, parameters such as prime loss parameters, and command patterns such as priming cycle command patterns.

In the illustrated embodiment, system conditions module 210 receives information from at least one of sensors 140, and may interpret the information
according to data stored on data storage module 240. For example, system conditions module 210 may convert analogue information from a sensor to digital information using the sensor data. System conditions module 210 may be configured to receive information relating to a condition of the fluid at a point in one or more lines. In the illustrated embodiment, system conditions module 210 receives information relating to a pressure 250 in system 100, for example from discharge pressure sensor 144. Systems conditions module 210 may additionally or alternatively receive information relating to another condition of the fluid, such as a temperature or flow rate of a fluid at a portion of a line, or information relating to a condition of the system, such as vibration or temperature, and/or may receive information from which any of these values can be calculated.

Prime loss module 220 is configured to interpret a prime loss condition 214 of diaphragm pump 102, and may also be configured to interpret a reprimed condition 216 of diaphragm pump 102. In the illustrated embodiment, prime loss module 220 evaluates information received by system conditions module 210, and may further evaluate information stored on data storage module 240. For example, prime loss module 220 may compare the sensor data to parameters stored on data storage module 240. A set of parameters may include a look-up table containing data regarding the system conditions. For example, a set of parameters may include a limit for one or more conditions, such as a pressure or flow rate as sensed by sensors 140. Violation of the limit may indicate prime loss condition 214, and a return to within the limit may indicate reprimed condition 216.

In an example embodiment, a parameter from data storage module 240 includes a pressure criterion and a time criterion, and prime loss module 220 determines prime loss condition 214 when a discharge line pressure drops below the pressure criterion for a time greater than the time criterion. Additionally or alternatively, prime loss module 220 may compare information from a first sensor 215 information from one or more other sensors. In certain embodiments, a failure of the discharge line pressure to increase in response to the pump actuation may be interpreted as prime loss condition 214.

Valve control module 230 is configured to generate and output valve commands 260, 270 in response to the condition interpreted by prime loss module 220. The valve commands are provided to valve system 120, and include at least a flow regulator command 260 provided to flow regulator 124. Flow regulator 124 is responsive to the flow regulator command, such that valve control module 230 controls operation of flow regulator 124. In response to prime loss condition 214, valve control module 230 issues a priming cycle command 262 including one or more opening commands 264 of an opening time $t_o$, thereby causing flow regulator 124 to provide a priming cycle. An example priming cycle is described following in the section referencing FIG. 3.

In certain embodiments, the prime loss module 220 determines reprimed condition 216. The determining reprimed condition 216 includes utilizing the same or distinct information from the information utilized to determine the unprimed condition. For example, if the discharge line pressure increases above a pressure criterion (which may be the same as or higher than the unprimed condition pressure criterion), and/or if the discharge line pressure is responsive to actuations of the pump, the prime loss module 220 determines that the pump is in reprimed condition 216. In response to reprimed condition 216, valve control module 230 may issue flow regulator commands 260 such that flow regulator 124 closes and/or remains closed.

In addition to flow regulator commands 260, valve control module 230 may issue additional commands in response to prime loss condition 214. For example, when injector 128 is an injector valve, valve control module 230 may issue an injector command, such that injector 128 is set to a closed state, and injection of urea into exhaust conduit 192 is stopped. Additionally or alternatively, valve control module 230 may issue an exit valve command 270.

In addition or in the alternative to valve control module 230, controller 130 may include a flow regulator command module 232 configured to provide flow regulator commands 260 to flow regulator 124. In certain embodiments, flow regulator operation module 232 may provide only the flow regulator command 260 to flow regulator 124, and may be a sub-module of valve control module 230. In other embodiments, flow regulator command module 232 may provide additional commands, such as, for example, those described above as being issued by valve command module 230.

The schematic flow diagram and related description which follows provides an illustrative embodiment of performing procedures for re-priming a diaphragm pump. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

Figure 3:
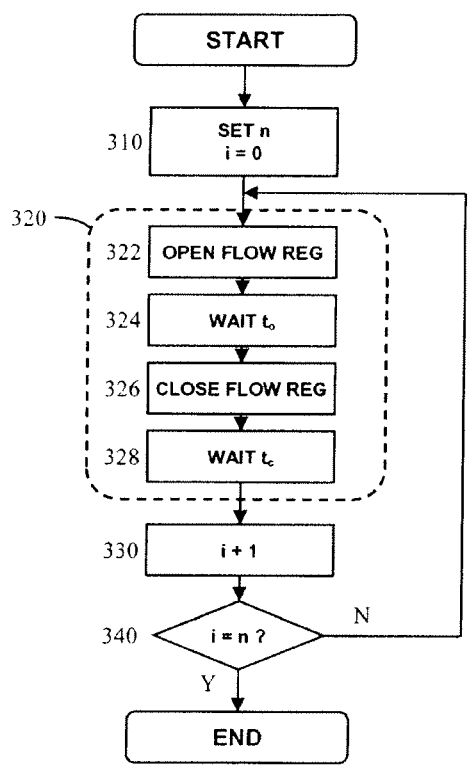
FIG. 3 is a schematic flowchart illustrating an example priming cycle.

Referencing FIG. 3, an example priming cycle 300 is described. In the illustrated embodiment, priming cycle 300 begins with setting 310 the number of iterations n that will be performed in priming cycle 300, and setting an iteration variable i to zero. The number of iterations n may be a predetermined number that remains the same in all priming cycles 300, or it may be based upon one or more criteria, such as the pressure in discharge line 112. In certain embodiments, the number of iterations n is between two and ten, inclusive. The provided operations are non-limiting examples, and any operations to perform a selected number of priming cycle operations are contemplated herein.

Each iteration 320 comprises an opening event, in which flow regulator 124 is opened for a predetermined opening time $t_o$. In other words, priming cycle 300 includes opening 322 flow regulator 124, and waiting 324 a predetermined opening time $t_o$ before closing 326 flow regulator 124. During this time period to, liquid urea solution flows from the high pressure field in discharge line 112 to the low pressure field in suction line 110 via recirculation line 114. The momentum of the liquid carries it into the compression chamber of diaphragm pump 102, where it the displaces the gas/vapor that is the cause of the unprimed condition. The presence of the additional liquid increases the effective compression ratio of the pump, allowing diaphragm pump 102 to break the airlock and restore prime.

Opening time $t_o$ is short, such that a burst of high pressure liquid travels from discharge line 112 to suction line 110 without significantly bleeding off pressure in discharge line 112. For example, in some embodiments, opening time $t_o$ is less than two seconds, and in certain embodiments, opening time $t_o$ is between 0.1 and one seconds, inclusive. The time for each opening time $t_o$ may be the same, increasing, or decreasing throughout the prime cycle 300 iterations. In certain embodiments, the opening time $t_o$ starts shorter and grows longer with each iteration. In certain embodiments, the opening time $t_o$ starts longer and grows shorter with each iteration.

Once opening time $t_o$ has elapsed, flow regulator 124 is closed 326 for a predetermined closing time $t_c$ 328. Closing time $t_c$ is greater than opening time $t_o$, and should be sufficient to allow the pump to build pressure, and attempt to purge the entrapped gases and recover prime. For example, in some embodiments, closing time $t_c$ is between two and ten seconds, inclusive. In certain embodiments, closing time $t_c$ is between three and seven seconds, inclusive. Closing time $t_c$ may be the same, growing longer, or growing shorter with each iteration. In certain embodiments, the closing time is performed until the discharge line pressure reaches a predetermined value, and/or until the discharge line pressure stops rising (e.g. changes by less than a threshold amount over a threshold period of time).

After each iteration, iteration variable i is incremented 330. Iteration variable i is compared 340 to the predetermined number of iterations n. If the predetermined number of iterations 320 have been performed 340Y, the priming cycle is complete. If fewer than the predetermined number of iterations 320 have been performed 340N, and additional iteration 320 is performed. The number of iterations n, opening time $t_o$, and closing time $t_c$ are selected such that the priming cycle does not decrease the discharge line pressure to a level below the ambient pressure multiplied by the compression ratio of diaphragm pump 102. Furthermore, opening time $t_o$ and closing time $t_c$ may remain constant or may vary from one iteration 320 to the next, and may remain constant or may vary from one priming cycle 300 to the next. In an example embodiment, opening time $t_o$ is set to about 0.5 seconds, closing time $t_c$ is set to about five seconds, and the number of iterations n is set to seven. As would be recognized by one having skill in the art, the value of each of these variables will depend on a number of conditions, such as the size and capacity of diaphragm pump 102 and the suction and discharge lines, and the examples provided hereinabove are not to be construed as limiting the scope of the invention.

In the illustrated embodiment, priming cycle 300 includes comparing 340 a predetermined number of iterations n to an iteration variable i, and performing an additional iteration 320 if the iteration variable i is not equal to predetermined number of iterations n. It is also contemplated that comparing 340 may additionally or alternatively include evaluation of other factors. By way of non-limiting example comparing 340 may include determining whether a pressure condition (for example as measured by discharge pressure sensor 144) is less than a pressure criterion (which may indicate that diaphragm pump 102 has not yet recovered prime), and performing an additional iteration 320 in response to the determining.

Additionally, priming cycle 300 may include closing exit valve 122 for a predetermined time. For example, valve control module 230 may provide an exit valve command that closes exit valve 122, such that the pressure in discharge line 112 rises, resulting in more urea being forced into the compression chamber of diaphragm pump 102 via recirculation line 114 and suction line 110.

It can be seen that a number of embodiments of the present disclosure are contemplated herein. An example set of embodiments is a system including a diaphragm pump having a suction port and a discharge port, a urea suction line fluidly coupling a urea supply to the suction port, a urea discharge line fluidly coupled to the discharge port, a recirculation line fluidly coupling the urea discharge line to the urea suction line, and a flow regulator operationally coupled to the recirculation line. The example system further includes a controller having a prime loss module that interprets a prime loss condition of the diaphragm pump and a flow regulator operation module that provides a flow regulator command in response to the prime loss condition. The flow regulator is responsive to the flow regulator command.

A number of non-limiting embodiments of an example system are described following. An example system includes the flow regulator operation module further providing the flow regulator command such that the flow regulator provides a priming cycle including a number of opening events, where the number of opening events may include between two and ten opening events, and wherein each opening event may include a flow regulator opening time between 0.1 and 1 seconds, inclusive. Additionally or alternatively, the example system includes the prime loss module interpreting a reprimed condition of the diaphragm pump, where the flow regulator operation module further provides the flow regulator command in response to the reprimed condition.

An example system includes the recirculation line having two openings, a first opening to the urea discharge line, and a second opening to the urea suction line; a diesel exhaust conduit having diesel exhaust flowing therethrough; and an injector fluidly coupled to the urea discharge line on an intake side, and operationally coupled to the diesel exhaust conduit on an outlet side. In certain further embodiments, the diesel engine exhausts to the diesel exhaust conduit, where the diesel engine produces an exhaust gas having a NOx constituent as a byproduct of operation. In certain further embodiments, the system includes a selective reduction catalyst disposed in the diesel exhaust conduit at a position downstream of the injector, and/or a vehicle including a powertrain, the powertrain including the diesel engine.

Another example set of embodiments is an apparatus including a system conditions module that interprets a pressure in a diaphragm pump system, a prime loss module that determines a prime loss condition in the diaphragm pump system, and a valve control module that provides a flow regulator command in response to the prime loss condition. Certain further example embodiments of an apparatus are described following.

An example apparatus includes the flow regulator command being a number of opening commands, and/or the flow regulator command having between 2 and 10 opening commands, inclusive, and/or each of the number of opening commands being of a duration between 0.1 and 1 seconds, inclusive. A still further example apparatus includes the prime loss module further interpreting a reprimed condition of the diaphragm pump, and where the flow regulator operation module further provides the flow regulator command in response to the reprimed condition. An example apparatus further includes the valve control module providing an exit valve command in response to the prime loss condition.

Another example set of embodiments is a method including interpreting a prime loss condition in a diaphragm pump system, the diaphragm pump being a diaphragm pump fluidly coupled to a urea suction line and a urea discharge line, in response to the prime loss condition, performing a priming cycle including at least one opening operation of a first predetermined duration, and each opening operation including opening a flow regulator provided to a recirculation line, such that the recirculation line fluidly couples the urea discharge line and the urea suction line. An example method further includes selectively injecting urea from the urea discharge line into a diesel exhaust conduit having diesel exhaust flowing therethrough, where the selectively injecting urea includes stopping the urea injection for a predetermined time in response to the prime loss condition.

An example method further includes producing an exhaust gas with a diesel engine which exhausts to the diesel exhaust conduit, the exhaust gas having a NOx constituent as a byproduct of operation, and wherein selectively injecting urea comprises operating an injector to provide urea to the diesel exhaust conduit upstream of a selective reduction catalyst. An example method includes the priming cycle further including closing the flow regulator for a second predetermined duration, and/or where the first predetermined duration includes between 0.1 and 1 seconds, inclusive. A further embodiment of the method includes the priming cycle further including closing the flow regulator for a second predetermined duration, the second predetermined duration comprising between 2 and 10 seconds, inclusive.

While the invention has been illustrated and described in detail in the drawings and foregoing description, the same is to be considered as illustrative and not restrictive in character, it being understood that only certain embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
a diaphragm pump having a suction port and a discharge port;
a urea suction line fluidly coupling a urea supply to the suction port;
a urea discharge line fluidly coupled to the discharge port;
a recirculation line fluidly coupling the urea discharge line to the urea suction line;
an exit valve operationally coupled to the urea discharge line downstream of the recirculation line;
a flow regulator operationally coupled to the recirculation line;
an injector valve operationally coupled to the urea discharge line downstream of the exit valve;
a controller comprising:
a prime loss module structured to interpret a prime loss condition of the diaphragm pump; and
a flow regulator operation module structured to provide a flow regulator command in response to the prime loss condition; and
a valve control module structured to selectively provide an exit valve command and an injector command in response to the prime loss condition,
wherein the flow regulator is responsive to the flow regulator command, and
wherein the exit valve is responsive to the exit valve command and the injector valve is responsive to the injector command, the exit valve command configured to selectively close the exit valve for a predetermined time in response to the prime loss condition and the injector command configured to selectively close the injector valve for a predetermined time in response to the prime loss condition.

2. The system of claim 1, wherein the flow regulator operation module is further structured to provide the flow regulator command such that the flow regulator provides a priming cycle comprising a plurality of opening events.

3. The system of claim 2, wherein the priming cycle comprises between two and ten opening events, inclusive.

4. The system of claim 2, wherein each of the plurality of opening events comprises a flow regulator opening time between 0.1 and 1 seconds, inclusive.

5. The system of claim 2, wherein the prime loss module is further structured to interpret a reprimed condition of the diaphragm pump, and wherein the flow regulator operation module is further structured to provide the flow regulator command in response to the reprimed condition.

6. The system of claim 1, wherein the recirculation line further consists of two openings, a first opening to the urea discharge line, and a second opening to the urea suction line.

7. The system of claim 1, further comprising:
a diesel exhaust conduit having diesel exhaust flowing therethrough; and
an injector fluidly coupled to the urea discharge line on an intake side, and operationally coupled to the diesel exhaust conduit on an outlet side.

8. The system of claim 7, further comprising a diesel engine which exhausts to the diesel exhaust conduit, the diesel engine producing an exhaust gas having a NOx constituent as a byproduct of operation.

9. The system of claim 8, further comprising a selective reduction catalyst disposed in the diesel exhaust conduit at a position downstream of the injector.

10. The system of claim 9, further comprising a vehicle comprising a powertrain, the powertrain including the diesel engine.

11. An apparatus comprising:
a controller communicatively coupled to a diaphragm pump system comprising a diaphragm pump, a urea suction line coupled to a pump suction port, a urea discharge line coupled to a pump discharge port, a recirculation line fluidly coupling the urea discharge line to the urea suction line, a flow regulator operatively coupled to the recirculation line, an exit valve operatively coupled to the discharge line, and an injector valve operationally coupled to the urea discharge line downstream of the exit valve, the controller comprising:
a system conditions module structured to interpret a pressure in the diaphragm pump system;
a prime loss module structured to determine a prime loss condition in the diaphragm pump system; and
a valve control module structured to provide a flow regulator command in response to the prime loss condition, the flow regulator responsive to the flow regulation command, and
the valve control module further structured to selectively provide an exit valve command and an injector command in response to the prime loss condition, wherein the exit valve is responsive to the exit valve command and the injector valve is responsive to the injector command, the exit valve command configured to selectively close the exit valve for a predetermined time in response to the prime loss condition and the injector command configured to selectively close the injector valve for a predetermined time in response to the prime loss condition.

12. The apparatus of claim 11, wherein the flow regulator command comprises a plurality of opening commands.

13. The apparatus of claim 12, wherein the flow regulator command comprises between 2 and 10 opening commands, inclusive.

14. The apparatus of claim 12, wherein each of the plurality of opening commands comprises a duration between 0.1 and 1 seconds, inclusive.

15. The apparatus of claim 12, wherein the prime loss module is further structured to interpret a reprimed condition of the diaphragm pump, and wherein the flow regulator operation module is further structured to provide the flow regulator command in response to the reprimed condition.

16. A method comprising:
interpreting a prime loss condition in a diaphragm pump system comprising a diaphragm pump fluidly coupled to a urea suction line and a urea discharge line,
in response to the prime loss condition, performing a priming cycle comprising at least one opening operation of a first predetermined duration;
each opening operation comprising opening a flow regulator provided to a recirculation line, such that the recirculation line fluidly couples the urea discharge line and the urea suction line; and selectively injecting urea from the urea discharge line into a diesel exhaust conduit having diesel exhaust flowing therethrough, wherein the selectively injecting urea includes stopping the urea injection for a predetermined time in response to the prime loss condition.

17. The method of claim 16, further comprising producing an exhaust gas with a diesel engine which exhausts to the diesel exhaust conduit, the exhaust gas having a NOx constituent as a byproduct of operation, and wherein selectively injecting urea comprises operating an injector to provide urea to the diesel exhaust conduit upstream of a selective reduction catalyst.

18. The method of claim 16, wherein the priming cycle further comprises closing the flow regulator for a second predetermined duration.

19. The method of claim 16, wherein the first predetermined duration comprises between 0.1 and 1 seconds, inclusive.

20. The method of claim 19, wherein the priming cycle further comprises closing the flow regulator for a second predetermined duration, the second predetermined duration comprising between 2 and 10 seconds, inclusive.

* * * * *